US009310131B2

(12) United States Patent
Luczaj et al.

(10) Patent No.: US 9,310,131 B2
(45) Date of Patent: Apr. 12, 2016

(54) COUNTER-CURRENT SHAFT, SHELF-TYPE DRYER WITH MOVING SHELVES FOR DRYING AGGLOMERATES OF A SMALL MECHANICAL STRENGTH

(75) Inventors: Krzysztof Luczaj, Bialystok (PL); Bogdan Dabrowski, Bialystok (PL); Janusz Sokolowski, Warsaw (PL); Krzysztof Switka, Bialystok (PL)

(73) Assignee: LSA SPOLKA Z OGRANICZONA ODPOWIEDZIALNOSCIA, Bialystok (PL)

( * ) Notice: Subject to any disclaimer, the term of this patent is extended or adjusted under 35 U.S.C. 154(b) by 1161 days.

(21) Appl. No.: 13/313,911

(22) Filed: Dec. 7, 2011

(65) Prior Publication Data

US 2012/0174427 A1 Jul. 12, 2012

(30) Foreign Application Priority Data

Dec. 7, 2010 (PL) ........................................ 393175

(51) Int. Cl.
*F26B 25/10* (2006.01)
*F26B 25/18* (2006.01)
*F26B 17/12* (2006.01)
(Continued)

(52) U.S. Cl.
CPC ............. *F26B 17/1491* (2013.01); *F26B 17/14* (2013.01); *F26B 25/008* (2013.01)

(58) Field of Classification Search
CPC ............. F26B 11/16; F26B 3/04; F26B 21/02
USPC ........... 34/165, 168, 171, 178–181, 237, 238, 34/443, 487, 508
See application file for complete search history.

(56) References Cited

U.S. PATENT DOCUMENTS 3,300,873 A * 1/1967 Bussell et al. .................. 34/168
4,263,722 A * 4/1981 Botkins et al. .................. 34/546
(Continued)

FOREIGN PATENT DOCUMENTS

CA 2760997 A1 6/2012
CN 201293533 Y 8/2009
(Continued)

OTHER PUBLICATIONS

Definition of "Lytag-type", Aug. 27, 2013.
(Continued)

*Primary Examiner* — Kenneth Rinehart
*Assistant Examiner* — John McCormack
(74) *Attorney, Agent, or Firm* — Roberts Mlotkowski Safran & Cole, P.C.

(57) ABSTRACT

A counter-current shaft dryer with moving shelves for drying agglomerates of a small mechanical strength having a vertical shaft, which comprises a top charging zone, a multi-level drying zone, preferably comprising from two thru six levels and a bottom discharging zone. An outlet stub pipe or outlet collector of drying gases situated between the bottom discharging zone and the drying zone. An outlet stub pipe or outlet collector of moist gases situated between the drying zone and the top charging zone. Shelves of the charging zone and the discharging zone are made of a number of rectangular not perforated sheet metal plates. Shelves of the drying zone are made of a number of rectangular perforated sheet metal plates. Every rectangular metal sheet plate shelf is attached along its long edge to parallel pins mounted swiveling to walls of the shaft, transverse against the axis of the shaft.

10 Claims, 1 Drawing Sheet

(51) Int. Cl.
*F26B 17/14* (2006.01)
*F26B 25/00* (2006.01)

(56) References Cited

U.S. PATENT DOCUMENTS

| | | | | | |
|---|---|---|---|---|---|
| 6,152,314 | A | * | 11/2000 | Besanko et al. .............. | 211/134 |
| 2012/0174427 | A1 | | 7/2012 | Luczaj et al. | |

FOREIGN PATENT DOCUMENTS

| | | | | | |
|---|---|---|---|---|---|
| CN | 201718382 | U | | 1/2011 | |
| GB | 109267 | A | | 2/1918 | |
| GB | 672079 | A | | 5/1952 | |
| PL | 153746 | | | 10/1991 | |
| PL | 193445 | | | 10/1999 | |
| PL | 376869 | A1 | * | 3/2007 | ................ C12C 3/02 |
| PL | 393175 | A1 | | 6/2012 | |
| PL | 212039 | | | 7/2012 | |
| PL | 215804 | B1 | | 1/2014 | |
| UA | 101753 | C2 | | 4/2013 | |

OTHER PUBLICATIONS

Definition of "Wrogran", Aug. 27, 2013.
Definition of "Gralit", Aug. 27, 2013.
Definition of "LSA Technology" Aug. 27, 2013.
Search Report of PL 393175 dated Feb. 24, 2011.

* cited by examiner

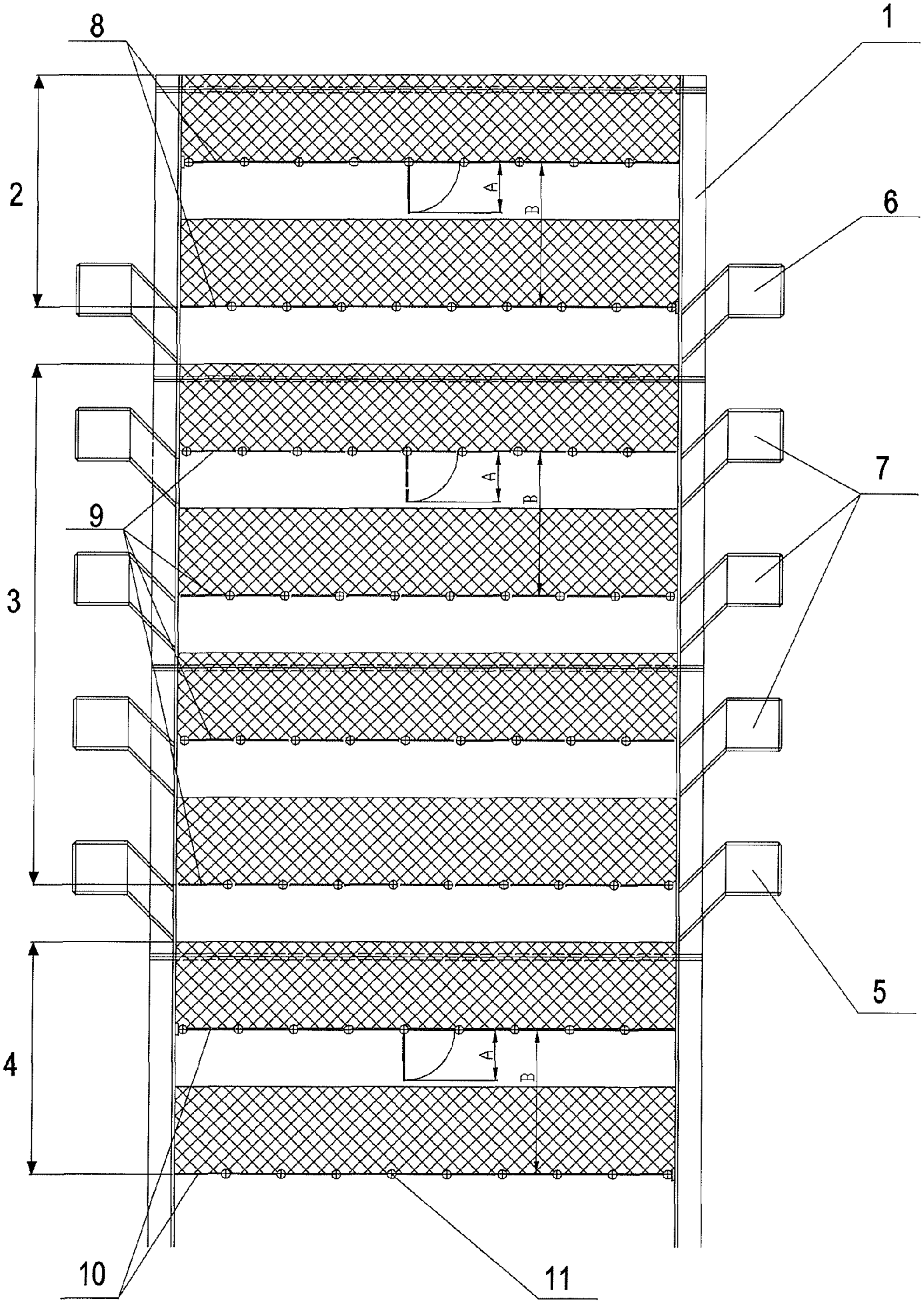
8
1
2
A
B
6
7
9
3
5
4
10
11

COUNTER-CURRENT SHAFT, SHELF-TYPE DRYER WITH MOVING SHELVES FOR DRYING AGGLOMERATES OF A SMALL MECHANICAL STRENGTH

CROSS-REFERENCE TO RELATED APPLICATIONS

The present Application is a US Utility Application which claims priority from Polish Application No. P-393175 filed on Dec. 7, 2010, which is hereby incorporated by reference in its entirety into the present Application.

FIELD OF THE INVENTION

This invention relates to a counter-current shaft, shelf-type dryer with moving shelves for drying agglomerates of a small mechanical strength.

BACKGROUND

Numerous methods are known during which one operation is the drying of agglomerated raw materials the grains of which show a small mechanical strength prior to their further processing in a process line. This is a situation e.g. in the process of manufacture of aggregates sintered from power plant cinders for the building industry and road building industry. When an aggregate is manufactured by sintering on a sintering belt (e.g. the Lytag technology) freshly granulated raw materials pouring out of a granulating plate are practically directly poured onto a sinter belt, where without any further pouring they are successively dried and sintered. In this way the problem of a drying operation is so to say bypassed. However, if the same process is carried out utilising the energy contained in raw materials (even autothermally) with this process as well being combined with utilisation of post-fermentation sediments, post-refining sediments or other therefore in a shaft oven (e.g. the Wrogran technology) or in a rotary oven (Gralit and LSA technology), then prior to feeding grains to a sintering equipment they should be first dried in order to obtain among other things the mechanical strength required for baking and sintering. In such cases belt dryers are usually used which while ensuring a minimum of pouring-over steps of mechanically weak grains at the same time transport these grains and feed them to an oven. However, the overall dimensions of belt dryers are relatively large, they consist of many moving parts, which wear out quickly, and are difficult to insulate to reduce thermal losses. Additionally, e.g. with the LSA technology, a direct feeding of hot granules from a belt dryer to a rotary concurrent oven would be difficult to realise due to process problems and space requirements.

A column pulse-fluidisation dryer is known from a Polish patent specification No 153746. On its top it comprises a wet material feeding batcher and in its bottom a discharging outlet of dried material and a number of drying sections equipped with an inlet collector with a gas inlet, gas distributors, thrust chambers ending with a screen shelf, a drying chamber equipped with a pour-over threshold and a gas outlet stub pipe. The middle drying sections are interconnected over pour-over channels for the material subject to drying. The drying sections are stacked one upon another, where the lower a given drying section is situated the higher is its pour-over threshold.

A closed loop drier for drying vegetable materials is also known from a Polish patent specification P376869. It has the form of a cylinder with shelves, where this cylinder is divided into a drying and a cooling part. Below an outlet or possibly outlets of hot gas there are mounted two not perforated shelves serving as a lock. The drying part is provided with drying shelves in the form of jalousie-type perforated laths. In the cooling part there are cooling shelves in the form of jalousie-type perforated laths under which there are an inlet stub pipe or inlet stub pipes of cooling gas. An outlet stub pipe or stub pipe outlets of cooling gas are situated above cooling shelves in which outlet or outlets exchangeable filters for the dust of the circulation gas and a dust blower are mounted. A rotary spreader for vegetable material (dried) is situated above the drying shelves and a rotary rake-out is situated under the cooling shelves. A vegetal material charging pipe and the outlet or outlets of the drying gas is mounted in the cover. Under the cover there are a rotary brush and replaceable gas filters for gas carried out from the drier, where further this gas is directed through the filter, cooler and a condensed water separator to the cooling section of the drier under the lowest shelf. The drier bottom is equipped with a stub pipe, preferably a square one to receive the dried vegetal material.

SUMMARY

A Counter-current shaft, shelf-type dryer with moving shelves for drying agglomerates of a small mechanical strength according to the invention is characterised in that a vertical, preferably a square shaft comprises a top, at least one, preferably a two-level charging zone, a multi-level, preferably from two through six level drying zone and a bottom, at least one, a preferably a two-level discharge zone. The inlet stub pipe or the inlet collector for drying gases are situated between the bottom discharge zone and the drying zone. The wet gas outlet stub pipe or the outlet collector is situated between the drying zone and the top charging zone. The charging zone shelves and the discharge zone shelves are made of a number of rectangular, non-perforated sheet metal plates. The drying zone shelves are made of a number of perforated rectangular metal sheet plates. Every rectangular metal plate is attached along its longer edge to parallel pins set swivelling in the shaft walls, transverse in relation to the shaft axis.

The ratio of the width of every rectangular plate "A" to the distance "B" between the shelves varies between 1:2 thru 1:5, preferrably 1:2, 5.

Moist gas stub pipes or intermediate collectors are situated between the drying zone shelves.

The pins are rotated by mechanical actuators, preferably hydraulic actuators. The actuators are controlled manually, but preferably electronically.

The design of the counter-current shaft, shelf-type dryer with moving shelves for drying agglomerates of a small mechanical strength is compact, its capacity is high and for the drying process it requires a small amount of energy.

The drier as per the invention can be easily insulated on the outside thus reducing the heat losses. The number of used drying levels depends on the humidity of a charge subject to drying, its fire point, its temperature and the amount of drying gases being fed and on the mechanical strength of moist grains.

BRIEF DESCRIPTION OF THE FIGURE

The counter-current shaft, shelf-type dryer with moving shelves for drying agglomerates of a small mechanical strength to the invention is shown as an example of the embodiment of the invention in FIG. 1, which shows schematically the longitudinal cross-section of the drier.

DETAILED DESCRIPTION

The counter-current shaft, shelf-type dryer with moving shelves for drying agglomerates of a small mechanical strength to the invention is constructed as a vertical, preferably a rectangular shaft 1 as shown in the FIGURE. The internal space of the shaft 1 is divided into three zones. The top charging zone 2 comprises two levels destined for the granulate subject to drying. The middle drying zone 3 consists of four levels and the bottom discharging zone 4 comprises also two granulate levels. Between the bottom discharging zone 4 (the surface of the granulate on the higher level of the zone 4) and the drying zone 3 (the lowest level of the zone 3) there is the drying gas inlet stub pipe or the inlet collector 5. The outlet stub pipe or the outlet collector 6 for moist gases is situated between the drying zone 3 (the granulate surface situated on highest level of the zone 3) and the upper charging zone 2 (the lower level of the zone 2). Shelves 8 of both levels of the charging zone 2 and shelves 10 of both levels of the discharging zone 4 are made of a number of not perforated rectangular sheet metal plates. However, the shelves 9 of the levels of the drying zone 3 are made of a number or rectangular perforated sheet metal plates. Every rectangular sheet metal plate of the shelves 8, 9 and 10 is attached with its longer edge to parallel pins 11 set swivelling in the walls of the shaft 1, transverse in relation to the axis of the shaft 1. The pins 11 are mounted along the surfaces constituting individual zone levels.

In the presented example of the embodiment of the invention the ratio of the rectangular metal sheet plate "A" width of every shelf 8, 9 and 10 to the distance between the shelves "B" is preferably 1:2, 5. Between the shelves 8 of the drying zone 3 (between the bottom surface of the shelf and the granulate surface on the shelf beneath a given shelf) there are the stub pipes or intermediate collectors 7 of humid gases.

The pins 11 are rotated by mechanical actuators, preferably hydraulic actuators. The actuators are controlled manually, but preferably electronically.

The drying operation of mechanically weak grains in the shaft drier to the invention consists in passing thru successive layers of agglomerate hot gases according to a counter-current pattern and in reception of moist outlet gases. Moist grains are fed from the drier top, dried grains are received at the drier bottom. Drying gases are fed onto the lowest screen shelf and are received after the first the topmost shelf with a perforated bottom. It is possible to receive moist gases after every drying shelf in case there is a danger the individual strata moisture will condense. Charging the drier and shifting the granulate takes place by steps, at a given interval, and the dried granulate moves by the force of gravity. Individual shelves open and close one by one with a delay required for grains to pour down from a given level.

DESIGNATIONS IN THE DRAWING

1 vertical shaft
2 upper charging zone
3 drying zone
4 lower discharging zone
5 inlet stub pipe or collector
6 outlet stub pipe or collector
7 intermediate collecting stub pipe
8 charging zone shelf
9 drying zone shelf
10 discharging zone shelf
11 pin
"A"—width of the rectangular metal plate
"B"—distance between shelves

The invention claimed is:

1. A counter-current shaft dryer, with moving shelves for drying agglomerates comprising:

a vertical rectangular shaft;

a top charging zone having at least one shelf;

a multi-level drying zone having at least two shelves;

a bottom discharging zone having at least one shelf;

an inlet stub pipe or inlet collector of drying gas situated between the bottom discharging zone and the drying zone; and an outlet stub pipe or outlet collector of moist is situated between the drying zone and the top charging zone, wherein shelves of the charging zone and shelves of the discharging zone are made of a number of rectangular non-perforated metal sheet plates, shelves of the drying zone are made of a number of rectangular perforated metal sheet plates, and each of the rectangular non-perforated metal sheet plates and each of the rectangular perforated metal sheet plates is attached along its long edge to parallel pins mounted swiveling in walls of the shaft, transverse against an axis of the shaft.

2. The counter-current shaft dryer of claim 1, wherein a ratio of the width "A" of a rectangular steel sheet plate of each of the shelves to the distance "B" between the shelves is in a range of 1:2 through 1:5.

3. The counter-current shaft dryer of claim 1, wherein between the shelves of the drying zone there are the stub pipes or intermediate collectors of moist gases.

4. The counter-current shaft dryer of claim 1, wherein the pins are rotated mechanically.

5. The counter-current shaft dryer of claim 1, wherein the pins are rotated hydraulically.

6. The counter-current shaft dryer of claim 2, wherein the ratio of "A" to "B" is 1:2.5.

7. The counter-current shaft dryer of claim 1, wherein the top charging zone has two shelves.

8. The counter-current shaft dryer of claim 7, wherein the multi-level drying zone has from two to six shelves.

9. The counter-current shaft dryer of claim 7, wherein the multi-level drying zone has four shelves.

10. The counter-current shaft dryer of claim 8, wherein the bottom discharging zone has two shelves.

* * * * *